Sept. 7, 1937.                G. W. WALTON                2,092,232
                              BEARING BOX
                         Filed Sept. 21, 1934
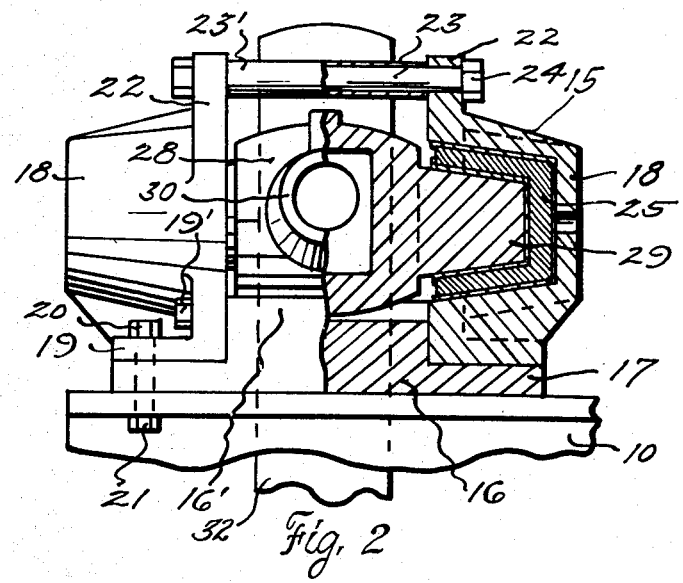
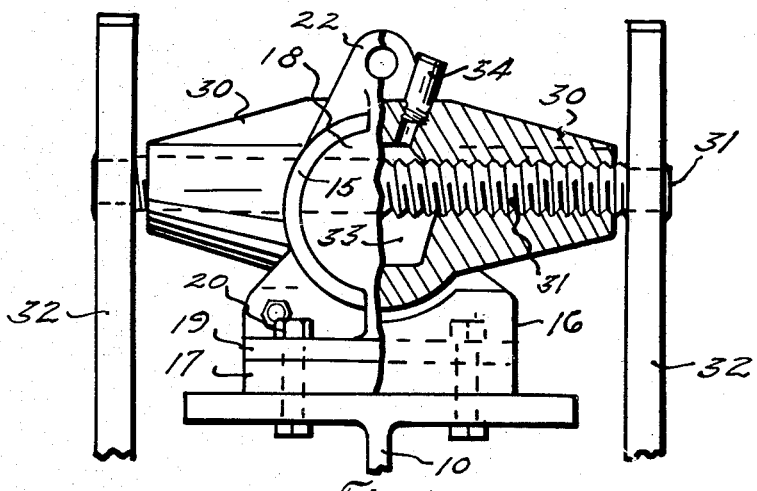
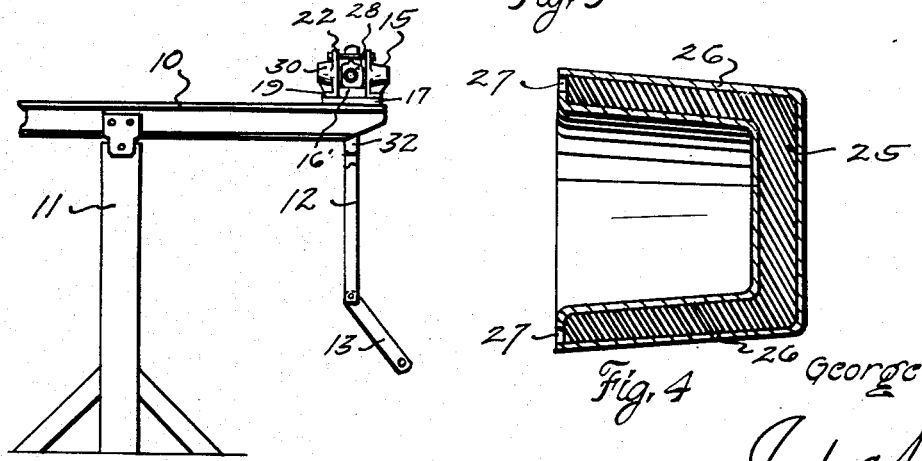
Inventor
George W. Walton
By Jack Ashley
Attorney Patented Sept. 7, 1937

2,092,232

UNITED STATES PATENT OFFICE 2,092,232

BEARING BOX

George W. Walton, Dallas, Tex.

Application September 21, 1934, Serial No. 744,914

10 Claims. (Cl. 308—21)

This invention relates to new and useful improvements in bearing boxes.

One object of the invention is to provide an improved bearing box, which is particularly adapted to be mounted on a walking beam or other swinging support.

An important object of the invention is to provide an improved yieldable mounting for the pivoted member of a bearing box, whereby said mounting may yield to compensate for angular deflections of its pivoted member and its connections, thus providing a universal mounting for the said pivoted member.

An important object of the invention is to provide a bearing box including a pivoted member for supporting a pitman or the like and a mounting in which said member is journaled, together with yieldable supports for the mounting, whereby the mounting may rock or move in all directions and also undergo a torsional movement to permit said pivotal member and its connections to readily swing and rock to compensate twisting and angular displacements.

Another object of the invention is to provide a mounting for a bearing pivot including yieldable supports held in frictional engagement with the mounting to prevent free rotation therein, but to permit a limited axial movement as well as a limited rocking movement of said mounting; also taking the end thrust thereof.

Still another object of the invention is to provide an improved bearing box including flexible members on which the pitman or the like connected to said bearing box is supported, whereby a flexible connection between the box and pitman is provided; the flexible members being readily removable so as to be easily replaced when worn, or for any other reason.

A further object of the invention is to provide an improved bearing box including a pivotal member screw-threaded in its mounting and capable of an oscillating movement, and a lubricant reservoir through which the pivotal member passes, whereby oscillation of the member will effect efficient self-lubrication.

Still another object of the invention is to provide a bearing box which will require only limited lubrication and which will be self applied, as well as one which will be noiseless in operation and also which will act as a shock absorber.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is an elevation of a bearing box constructed in accordance with the invention and mounted on a walking beam, Figure 2 is an enlarged view of the box partly in elevation and partly in section, Figure 3 is a view similar to Figure 2 and taken at right angles thereto, and Figure 4 is a detail sectional view of one of the yieldable supporting members.

In the drawing, the numeral 10 designates a walking beam which is mounted to swing on the usual jack post 11. The beam is shown as comprising an I-shaped channel bar, and a pitman 12 is connected to one end of the beam while a polished rod (not shown) is connected to the opposite end. The other end of the pitman is connected with a rotating crank arm 13.

For providing the connection between the upper end of the pitman and the walking beam 10, a bearing box 15 is mounted on said beam at one end thereof. It is to be understood that the invention resides in the bearing box and its mounting on a walking beam and connection with a pitman is used merely to explain its use. The box includes a base 16 having outwardly extending flanges 17 at its front and rear (Figure 2). The flanges rest on the top of the beam and cushion caps 18 are supported on the flanges at the front and rear of the base.

Each cap 18 has a flange 19 at its lower end and bolts 20 pass through this flange, through the flange 17 of the base, and through the top of the beam 10, and receive nuts 21 to securely fasten the caps and base in position. The upper end of each cap is provided with an upwardly extending ear 22. An elongated bolt 23 passes through the ears and receives a nut 24 on its end. A spacer sleeve 23' surrounds the bolt between the ears and acts to space the ears and caps apart. The caps are held in intimate contact with a boss 16' on the base by bolts 19' passing therethrough.

Within each cushion cap, a yieldable cup-shaped liner 25 is positioned. The liner is preferably constructed of rubber compound, or other similar material, and may be encased in a thin metal casing 26, although the casing may be omitted. The liner is an important feature of the invention and fits snugly within each cap 18. A clearly shown in Figure 4, the casing is constructed of an outer portion which covers the outside of the liner and an inner portion which fits within the liner. A narrow annular space 27 is provided between the outer and inner portions of the casing, whereby the liner proper may be distorted and will yield without interference from the casing.

A gudgeon 28 is mounted between the caps 18 and has forwardly and rearwardly extending tapered trunnions 29 which fit snugly within the liner casings 26 of the caps.

By tightening the bolts 19' and 23 the trunnions 29 are frictionally engaged in the casings 26 and while said trunnions and the gudgeon are thus held against free rotation, the liners permit the gudgeon to undergo a torsional or rocking movement about its longitudinal axis. The liners also provide for rocking or swinging of the gudgeon in all planes of its longitudinal axis, thus providing universal movement.

Bearing bosses 30 extend from opposite sides of the center of the gudgeon at substantially right angles to the longitudinal axis of said gudgeons. A transverse pivotal member or pintle 31 is screw-threaded through the bosses and has its ends projecting therefrom. The upper ends of hanger bars 32 forming part of the pitman 12, may be welded on the ends of the pintle. The bosses and pintle have sufficient extension to space the bars from the sides of the beam 10. When the pitman is operated the pintle 31 will oscillate in the gudgeon.

For properly lubricating the pintle 31, which is the only part requiring lubrication, a central reservoir 33 is formed within the gudgeon 28 between the bosses 30. The pintle passes through this reservoir, and being screw-threaded, it will be seen that as the pintle oscillates, its threads will pick up the lubricant and carry it therealong, whereby proper lubrication is had at all times. For filling the reservoir, an oil cup or fitting 34 is tapped into the gudgeon and connects with said reservoir.

It is pointed out that the gudgeon 28 as before stated, is securely clamped between the caps 18 in the liners 25 and is incapable of free rotary movement therein. However, if any twisting deflection or unevenness of operation occurs in the pitman, the same will be compensated by the universal movement of the gudgeon 28 in the liners 25. This yieldable mounting eliminates danger of breakage when undue strain or twist is placed on the pitman or its connection. The liner is readily removable from within the caps and may easily be replaced when worn. The metal casing around each liner provides a protecting surface which increases the life of said liner.

A bearing box constructed in accordance with the invention will be adequately lubricated as well as substantially noiseless in operation. The yieldable mounting will not only compensate angular displacements of the gudgeon 28 and its connections, but will constitute a cushion and thus, a shock absorber. The liners or cushions also take the end thrust of the gudgeon.

What I claim and desire to secure by Letters Patent is:

1. In a bearing box, a support having oppositely positioned bearing caps, yieldable liners within said caps, a gudgeon having trunnions engaged in the liners to undergo universal rocking and horizontal movement, means for frictionally holding the gudgeon against rotation between the caps, and a pivotal member journaled in the gudgeon at right angles to the longitudinal axis of said gudgeon, said member having screw threads for conducting a lubricant therethrough.

2. In a bearing box, a support, yieldable liners in the support, a gudgeon having trunnions engaging in and frictionally held in the yieldable liners so that the gudgeon may undergo torsional as well as rocking and swinging movements, and a pivotal member journaled in the gudgeon and having screw threads for conducting a lubricant therethrough.

3. A bearing box including, a support having tapered recesses therein, a mounting having trunnions on its ends supported in said recesses, tapered cupped liners of rubber-like material inserted in said recesses and enveloping under compression the trunnions of said mounting, whereby the mounting is capable of limited universal movement, and a member pivoted to said mounting at a right angle to the longitudinal axis of the trunnions, whereby said member may undergo universal movement.

4. A bearing box including, a support having recesses therein, a mounting having trunnions on its ends engaging in said recesses, yieldable liners inserted in said recesses and enveloping the trunnions of said mounting, whereby the mounting is capable of a rocking movement, a member pivoted to said mounting at a right angle to the longitudinal axis of the trunnions, whereby said member may undergo universal movement, and a threaded pintle for pivoting said member to the mounting for conducting a lubricant therealong.

5. A bearing box including, a support having recesses therein, a mounting having a central lubricant reservoir, trunnions on said mounting engaging in the recesses of said support, yieldable liners in said recesses and enveloping the trunnions, whereby the mounting may undergo a rocking movement, a threaded pintle extending centrally through the mounting at right angles to the longitudinal axis of the trunnions so as to pass through the central lubricant reservoir for conducting a lubricant therealong, and a member attached to the outer ends of said threaded pintle, whereby said member may undergo universal movement.

6. A bearing box including, a support, a mounting having its ends engaging in the support, elastic liners within the support and enveloping the ends of said mounting to permit said mounting to undergo a rocking movement, and a vertical member journaled in said mounting at a right angle to the longitudinal axis of the engaging ends, whereby said member may undergo universal movement.

7. A bearing box including, a support, a mounting having its ends engaging in the support, elastic liners within the support and enveloping the ends of said mounting to permit said mounting to undergo a rocking movement, a threaded pintle extending through the mounting at a right angle to the longitudinal axis of said engaging ends for conducting a lubricant therealong, and a member secured to the ends of said pintle, whereby said member is journaled on the mounting and is capable of universal movement.

8. In a bearing box of the character described, a support, yieldable hollow liner members composed of rubber-like material and inserted in axially opposed relation in the support, a mounting having axially opposed trunnions fitted in said liner members, means for compressing said liner members surroundingly about the trunnions whereby to hold the mounting with limited universal movement therein, and a transverse pivotal member journaled in the mounting.

9. In a bearing box of the character described, a support, opposed hollow cap members which are adjustable with relation to each other on said support, yieldable liners of flexible and resilient material in said cap members, a gudgeon having opposed trunnions fitted and frictionally held in said liners, means for holding said cap members in adjusted relation to compress said liners surroundingly about said trunnions, and a transverse pivotal member journaled in the gudgeon.

10. In a bearing box of the character described, a support, oppositely positioned bearing caps which are adjustably mounted with relation to each other on said support, liners of flexible and resilient material within said caps, a gudgeon having opposed trunnions fitted in the liners, means for adjusting said bearing caps toward each other to compress said liners surroundingly about said trunnions, and a pivotal member journaled in said gudgeon at right angles to the axis of said trunnions.

GEORGE W. WALTON.